Oct. 9, 1934.  G. WILKES  1,976,646
CONTROL CIRCUIT FOR HEAT PUMP TEMPERATURE CONTROL REGULATING SYSTEMS
Filed Feb. 13, 1932
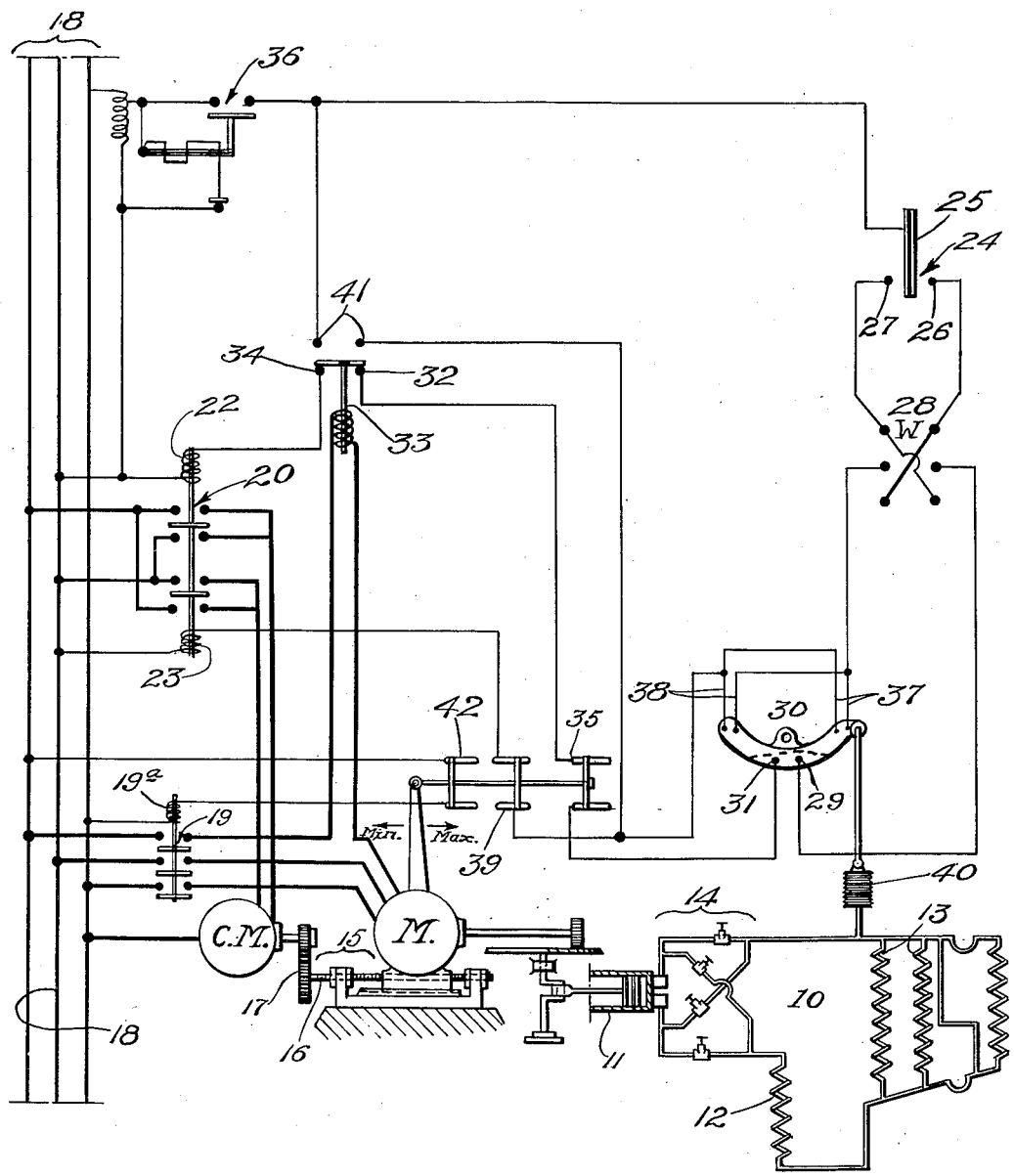

Patented Oct. 9, 1934

1,976,646

UNITED STATES PATENT OFFICE 1,976,646

CONTROL CIRCUIT FOR HEAT PUMP TEMPERATURE CONTROL REGULATING SYSTEMS

Gilbert Wilkes, Jacksonwald, Pa., assignor to Wilkes Avery Corporation, New York, N. Y., a corporation of New York Application February 13, 1932, Serial No. 592,832

27 Claims. (Cl. 62—4)

This invention relates to control means for temperature regulating apparatus, and more particularly to control means for that type of apparatus illustrated in my prior application Serial No. 583,125, filed December 24, 1931, for House temperature controlling apparatus. In said application I have illustrated a method of regulating the temperature of dwellings or other inclosures by means of a reversible refrigerating system employing instead of the usual condenser and evaporator coils, two coils or banks of coils adapted to alternately operate as condensers and evaporators so that heat may be either collected from the interior of the dwelling and expelled at the exterior thereof, or collected at the exterior of the building and dispelled at the interior thereof. In employing such a system in regulating the temperature of dwellings it will be obvious that the compressor must be operated at variable speeds so that it may compensate for temperature changes both within and without the dwelling and the speed changes must, obviously, be under the control of a thermostat. The compressor connections with the coils must be reversible in order that the apparatus may be used for heating or cooling, as desired, and, accordingly, any control system employed must likewise be capable of reversal. It will also be obvious that under certain conditions, excessive pressures or vacuums are detrimental to the best operation of the system.

Important objects of this invention are; the provision of a control apparatus for a system of this character embodying a constant speed motor having a variable speed driving connection with the compressor and a control motor by means of which the constant speed motor may be shifted or the driving connection between this motor and the compressor regulated so that a desired compressor speed is attained, this control motor being in turn under the control of a thermostat; the provision of means whereby excessive operation of the control motor is eliminated and the continuous operation which would ordinarily be instituted by a thermostat substituted for by an intermittent operation permitting a variation in compressor speed to exercise its effect upon the thermostat before the attainment of any excessive speed; the provision of means whereby the generation of excessive pressures or underpressures in the system or the overloading of the compressor-operating motor will so transfer the control circuit connections that, at each operation of the time delay mechanism, the control motor acts to reduce the speed of the compressor regardless of the then existing action of the thermostat; and the provision of these features in a system which is readily reversible.

These and other objects I attain by the arrangement illustrated in the accompanying drawing wherein the figure is a diagram illustrating the controlling means employed.

Referring now more particularly to the drawing, the numeral 10 generally designates a reversible refrigerating system including a compressor 11, two evaporator-condenser coils 12 and 13, of which the coil 12 is disposed exteriorly to the dwelling or to the space the temperature of which is being controlled, and the coil 13 is disposed interiorly of said space or suitably connected thereto for temperature regulation. The compressor 11 is connected in series with these coils, the connections including valve mechanism generally designated at 14 whereby the discharge of the compressor may be connected to either of the coils 12 or 13 as desired. M designates a constant speed drive motor for driving compressor 11 and connected to the compressor 11 by a variable speed drive 15 at present shown as of that type wherein a decrease in the distance between the motor and compressor reduces the speed of operation of the compressor and an increase in the space results in an increase in speed of the compressor. The motor M is mounted for movement toward and away from the compressor and is controlled in these movements by a threaded shaft 16 driven through gearing 17 from a control motor CM. The motor M derives power from a source 18 through a magnetically controlled switch 19 while the control motor CM derives current from the same source through an electromagnetically operated reversing switch 20, said switch 20 normally open and closable by one or the other of controlling coils 22 and 23 associated therewith.

The numeral 24 designates a thermostatic switch having a movable element 25 to co-act with either of two contacts 26 or 27 as the temperature rises or falls. The high terminals 26 and 27 of the thermostatic switch are connected with the input terminals of a reversing switch 28, the blade of this switch having one throw thereof connected with a terminal 29 of a normally connected pair of terminals in a pressure-operated switch 30. The second terminal 31 of this pair is connected with one terminal 32 of a back contacted overload relay switch 33 the coil of which is connected in one of the supply lines of motor M between this motor and the switch 19. The second terminal 34 of this switch is connected through a high limit switch 35 and coil 22 of switch 20 with one wire of source 18. A second wire of source 18 is connected through an automatic switch 36 with the blade 25 of thermostatic switch 24.

Upon completion of the circuit just described by closing of blade 25 upon contact 26 with switch 28 in the W position, or position which it occupies in winter, the circuit is closed through overload relay switch 33 and limit switch 35 upon coil 22 thus closing the circuit control motor CM to cause the same to operate in a direction increasing the distance between the motor M and the compressor 11 and, therefore, increasing the speed thereof. The operation of the control motor M is not continuous, however, for automatic switch 36 acts to alternately open and close this circuit at desired intervals. As at present disclosed, this switch is shown as of that type wherein a bimetallic bar is acted upon by a heater to produce the switch opening and closing movements. Any suitable type of timing switch may, however, be employed in lieu of the illustrated switch 36.

In addition to the contacts 29 and 31, switch 30 includes two pairs of inter-related contacts generally designated at 37 and 38, one contact of each pair being connected with the second throw of the blade of reversing switch 28 and the other contact of each pair being connected to the blade of thermostatic switch 24 and, accordingly, at each closing operation of automatic switch 36, with one side of the power line. The terminals connected with the switch blade 28 are likewise connected through a low limit switch 39 and coil 23 of switch 20 with the power source 18.

This results in the following operation in event compressor 11 creates either excessive pressure or an excessive underpressure in the coil 13. Switch 30 is rocked by a pressure mechanism 40 to close the circuit of one or the other of pairs of contacts 37 or 38. With either of these pairs of contacts closed the circuit is established as follows: From the source 18 to one contact of the pair 37 or 38; and from the other contact of the pair through low limit switch 39 to coil 23 and the source 18. The supply of current to control motor CM is thus reversed and the control motor begins to operate to advance motor M toward the compressor 11 and thus reduce the speed of the compressor, this operation being under control of the automatic switch 36. Motor CM will continue to operate to reduce the speed of compressor 11 until an equilibrium is established with the switch 30 when this switch will resume its normal position again placing the circuit on thermostatic control. The back contacts 41 of switch 33 are connected one to the source of current 18 through switch 36 and the other to the low speed limit switch 39 with the result that an overload upon motor M will immediately place the control motor on speed reducing operation and speed reduction will continue, controlled by switch 36, until the overload is released or low speed limit switch 39 is opened. Switch 19 closes when, following an operation of the control motor, a further limit switch 42 is closed. It will be noted that each of switches 30 and 33 when operated from its normal position acts to open one of the parallel branches of the control motor control circuit and to render the thermostatic means inoperative.

The complete operation of the system is as follows: During a heating period the thermostat blade 25 closes upon contact 26 completing the circuit through switches 36, 30, 33 and 35 to coil 22 closing switch 20 to initiate operation of the control motor to shift motor M and increase the speed of compressor 11. A slight shift of the motor, which is not yet in operation, causes limit switch 42 to close, thus completing the circuit through the actuating coil 19—a of switch 19 and closing the circuit to motor M. Assuming that the blade and contact 25 and 26 remain closed on one another through the period of inoperation of switch 36 and until this switch is again closed, the control motor will again operate to increase the speed of compressor 11 and will continue to do so until a temperature is reached in the space controlled by thermostat 24 at which the blade separates from contact 26. Should the thermostat require a greater heat delivery than the compressor is capable of delivering, or should the cooling means of condenser 13 fail, switch 30 will operate under excess pressure with the result that the control line including the switches 24—26, 30, 33, and 35 is opened and a circuit completed through switch 39 and coil 23 to reverse the operation of the control motor and reduce the speed of the compressor until the switch 30 resumes its normal position. If, under the same conditions, the load on motor M becomes excessive or if this load become excessive for any other reason, overload relay 33 will operate to close the same circuit. When the setting of thermostat 24 is reduced, as for example for night service, the blade 24 will close on switch 27, thus immediately closing a circuit through low limit switch 39 and coil 23 to slow down the compressor until an equilibrium is reached or until the limit switches 39—42 are opened, thus preventing over-travel of the drive control mechanism 16—17 and causing the opening of switch 19 under the influence of its biasing means. Limit switch 35 in addition to the function hereinbefore described, serves as a means positively limiting travel of motor M under influence of motor CM in increasing the speed of compressor 11.

It will be obvious that with a control of this character the various difficulties rising in operation of a system of this character automatically are eliminated and damage to the apparatus prevented. The underpressure operation of switch 30 for example may be made to take place at that point at which frosting of coil 13 would occur during those periods when this coil is operating to absorb heat. Particular attention is directed to the fact that switch 36 will act to prevent over-heating or over-chilling by the apparatus as a result of continued effort of control motor CM to increase or decrease the speed of the compressor. Were the control motor directly operated until the desired heat had been obtained, the lag in heat transfer from coil 13 to the thermostat 24 would result in compressor speeds which were either excessive or too low, necessitating an increased number of operations of the thermostat before a heat balance could be obtained. Switch 28 is employed to enable manual reversal of the thermostat circuit when the apparatus is transferred from heating to a cooling function. All that is necessary for a complete transfer of these operations is the manipulation of the valve system 14 and the operation of this switch.

Since the arrangement illustrated is obviously capable of certain modifications without in any manner departing from the spirit of my invention, I do not wish to be understood as limiting myself thereto except as hereinafter claimed.

I claim:
1. In combination with temperature control apparatus including a pair of evaporator-condenser coils and a compressor reversibly connected in a closed series therewith, a variable speed drive for the compressor, a reversible motor controlling the speed of said drive and a thermostat controlling the direction of rotation of the motor.

2. In combination with temperature control apparatus including a pair of evaporator-condenser coils and a compressor reversibly connected in a closed series therewith, a variable speed drive for the compressor, a reversible motor controlling the speed of said drive and a circuit controlling the direction of rotation of the motor including a thermostatic switch and a timing switch.

3. In combination with temperature control apparatus including a pair of evaporator-condenser coils and a compressor reversibly connected in a closed series therewith, a variable speed drive for the compressor, a reversible motor controlling the speed of said drive, and a circuit controlling the direction of rotation of the motor including parallel branches, thermostatic means to selectively close said branches and means to close one of said branches and render the thermostatic means inoperative.

4. In combination with temperature control apparatus including a pair of evaporator-condenser coils and a compressor reversibly connected in a closed series therewith, a variable speed drive for the compressor, a reversible motor controlling the speed of said drive and a circuit controlling the direction of rotation of the motor including parallel branches, thermostatic means to selectively close said branches and means to reversely connect the branches with said thermostatic means.

5. In combination with temperature control apparatus including a pair of evaporator-condenser coils and a compressor reversibly connected in a closed series therewith, a variable speed drive for the compressor, a reversible motor controlling the speed of said drive and a circuit controlling the direction of rotation of the motor including parallel branches, thermostatic means to selectively close said branches, means to reversely connect the branches with said thermostatic means, and means to close one of said branches and render the thermostatic means inoperative.

6. A device according to claim 2 wherein the circuit includes parallel branches each controlling rotation of the motor in one direction and means to close one of said branches and render the thermostatic means inoperative.

7. A device according to claim 2 wherein the circuit includes parallel branches each controlling rotation of the motor in one direction and means to close one of said branches and open the other thereof.

8. A device according to claim 2 wherein the circuit includes parallel branches each controlling rotation of the motor in one direction and means to close one of said branches and render the thermostatic means inoperative comprising a pressure-operated switch having a pressure connection with one of said coils.

9. A device according to claim 2 wherein the circuit includes parallel branches each controlling rotation of the motor in one direction and means to close one of said branches and open the other thereof comprising a pressure-operated switch having a pressure connection with one of said coils.

10. A device according to claim 3 wherein said means to close one of the branches comprises a pressure-operated switch having a pressure connection with one of the coils.

11. A device according to claim 3 wherein said means to close one of the branches comprises a switch operated by overload of the variable speed drive of the compressor.

12. A device according to claim 3 wherein the variable speed drive includes a motor and said means to close one of said branches comprises an overload relay in the operating circuit of said motor.

13. In combination with temperature control apparatus including a pair of evaporator-condenser coils and a compressor reversibly connected in a closed series therewith, a variable speed drive for the compressor, a reversible motor controlling the speed of said drive and a thermostat controlling the direction of rotation of the motor, and a switch for reversing the connections between the thermostat and motor.

14. In combination with temperature control apparatus including a pair of evaporator-condenser coils and a compressor reversibly connected in a closed series therewith, a variable speed drive for the compressor, a reversible motor controlling the speed of said drive, and a circuit controlling the direction of rotation of the motor including parallel branches, thermostatic means to selectively close said branches, means responsive to pressure in said temperature control apparatus closing one of said branches and opening the other thereof and means responsive to overload of said variable speed drive to close one of said branches and open the other thereof.

15. In combination with temperature control apparatus including a pair of evaporator-condenser coils and a compressor mechanism, means operable to variably control the output of the compressor, and a circuit controlling the operation of the compressor output control means including a thermostatic switch and a timing switch.

16. In combination with temperature control apparatus including a pair of evaporator-condenser coils and a compressor mechanism, means operable to variably control the output of the compressor, and a circuit controlling the operation of the compressor output control means including parallel branches, thermostatic means to selectively close said branches, and means to close one of said branches and render the thermostatic means inoperative.

17. In combination with temperature control apparatus including a pair of evaporator-condenser coils and a compressor mechanism, means operable to variably control the output of the compressor and a circuit controlling the operation of the compressor output control means including parallel branches, thermostatic means to selectively close said branches, and means to reversely connect the branches with said thermostatic means.

18. In combination with temperature control apparatus including a pair of evaporator-condenser coils and a compressor mechanism, means operable to variably control the output of the compressor, and a circuit controlling the operation of the compressor output control means including parallel branches, thermostatic means to selectively close said branches, means to reversely connect the branches with said thermostatic means, and means to close one of said branches and render the thermostatic means inoperative.

19. Device according to claim 15 wherein the circuit includes parallel branches, each controlling operation of the compressor output control means, and means to close one of said branches and render the thermostatic means inoperative.

20. A device according to claim 15 wherein the circuit includes parallel branches, each controlling operation of the compressor output control means, and means to close one of said branches and open the other thereof.

21. A device according to claim 15 wherein the circuit includes parallel branches, each controlling the compressor output control means, and means to close one of said branches and render the thermostatic means inoperative, comprising a pressure operated switch having a pressure connection with one of said coils.

22. A device according to claim 15 wherein the circuit includes parallel branches, each controlling the compressor output control means, and means to close one of said branches and open the other thereof, comprising a pressure-operated switch having a pressure connection with one of said coils.

23. A device according to claim 16, wherein said means to close one of the branches comprises a pressure operated switch having a pressure connection with one of the coils.

24. A device according to claim 16 wherein said means to close one of the branches comprises a switch operated by overload of the compressor control means.

25. A device according to claim 16 wherein the means operable to control the compressor output includes a motor and said means to close one of said branches comprises an over-load relay in the operating circuit of said motor.

26. In combination with temperature control apparatus including a pair of evaporator-condenser coils and a compressor mechanism, means operable to variably control the compressor output, thermostatic means controlling the operation of the compressor control means, and a switch for reversing the connections between the thermostat and the compressor control means.

27. In combination with a temperature control apparatus including a pair of evaporator-condenser coils and a compressor mechanism, means operable to variably control the output of the compressor, and a circuit controlling the operation of the compressor control means including parallel branches, thermostatic means to selectively close said branches, means responsive to pressure in said temperature control apparatus closing one of said branches and opening the other thereof, and means responsive to over-load of said compressor output control means to close one of said branches and open the other thereof.

GILBERT WILKES.